(12) United States Patent
Wang et al.

(10) Patent No.: US 10,418,618 B2
(45) Date of Patent: Sep. 17, 2019

(54) TOP COVER STRUCTURE FOR POWER BATTERY AND POWER BATTERY

(71) Applicant: CONTEMPORARY AMPEREX TECHNOLOGY CO., LIMITED, Ningde (CN)

(72) Inventors: Zhiyu Wang, Ningde (CN); Peng Wang, Ningde (CN); Rulai Cai, Ningde (CN); Baisong Chen, Ningde (CN)

(73) Assignee: CONTEMPORARY AMPEREX TECHNOLOGY CO., LIMITED, Ningde, Fujian Province (CN)

( * ) Notice: Subject to any disclaimer, the term of this patent is extended or adjusted under 35 U.S.C. 154(b) by 244 days.

(21) Appl. No.: 15/479,216

(22) Filed: Apr. 4, 2017

(65) Prior Publication Data
US 2018/0138488 A1     May 17, 2018

(30) Foreign Application Priority Data
Nov. 16, 2016   (CN) .......................... 2016 1 1007862

(51) Int. Cl.
*H01M 2/30* (2006.01)
*H01M 2/34* (2006.01)
(Continued)

(52) U.S. Cl.
CPC ........... *H01M 2/345* (2013.01); *H01M 2/043* (2013.01); *H01M 2/1229* (2013.01); *H01M 2/30* (2013.01);
(Continued)

(58) Field of Classification Search
CPC .... H01M 2/345; H01M 2/043; H01M 2/0482; H01M 2/0486; H01M 2/348;
(Continued)

(56) References Cited

U.S. PATENT DOCUMENTS

| 2013/0029191 A1 | 1/2013 | Byun et al. |
| 2013/0130072 A1 | 5/2013 | Guen |

(Continued)

FOREIGN PATENT DOCUMENTS

| CN | 103050646 A | 4/2013 |
| CN | 203150627 U | 8/2013 |

(Continued)

OTHER PUBLICATIONS

First Office Action and search report from CN app. No. 201510438316.3, dated Dec. 30, 2016, with machine English translation provided by SIPO.

(Continued)

*Primary Examiner* — Stephen J Yanchuk
(74) *Attorney, Agent, or Firm* — Ladas & Parry, LLP

(57) ABSTRACT

The present application relates to a top cover structure for a power battery and a power battery, the top cover structure includes a first electrode assembly, a second electrode assembly, a first resistor, a second resistor, a top cover plate, a first short circuit component and a second short circuit component, the first electrode assembly is electrically connected with the top cover plate through the first resistor for all time, the first short circuit component and the second short circuit component are both attached onto the top cover plate, when an internal pressure of the power battery exceeds a reference pressure, the first short circuit component and the second short circuit component deform by effect of pressure, so as to form a first electrical connecting path and a second electrical connecting path, the second resistor is connected into the first electrical connecting path in series.

14 Claims, 9 Drawing Sheets

(51) Int. Cl.
*H01M 2/04* (2006.01)
*H01M 2/12* (2006.01)

(52) U.S. Cl.
CPC .... *H01M 2200/20* (2013.01); *H01M 2220/20* (2013.01)

(58) Field of Classification Search
CPC ........... H01M 2/305; H01M 2200/103; H01M 2200/20; H01M 2200/10
See application file for complete search history.

(56) References Cited

U.S. PATENT DOCUMENTS

2015/0132619 A1 5/2015 He et al.
2017/0025665 A1* 1/2017 Li .................... H01M 2/043

FOREIGN PATENT DOCUMENTS

| CN | 204333054 U | | 5/2015 |
| CN | 105098108 | * | 11/2015 |
| CN | 105098108 A | | 11/2015 |
| CN | 204809275 U | | 11/2015 |
| EP | 2461393 A1 | | 6/2012 |
| EP | 3121867 A1 | | 1/2017 |
| JP | 2008066255 A | | 3/2008 |
| JP | 2011124214 A | | 6/2011 |
| JP | 2012119303 A | | 6/2012 |
| JP | 2013058475 A | | 3/2013 |
| JP | 2014082073 A | | 5/2014 |
| JP | 2015095462 A | | 5/2015 |

OTHER PUBLICATIONS

Second Office Action and search report from CN app. No. 201510438316.3, dated May 31, 2017, with machine English provided by Google Translate.
Extended European Search Report from EP app. No. 17000583.9, dated Jul. 17, 2017.
Notice of Refusal for JP app. No. 2015-170301, dated Aug. 2, 2016, with machine English translation from Google Translate.
Notification of Reasons for Refusal for JP app. No. 2015-170301, dated Mar. 14, 2017, with machine English translation from JPO.
Notification of Reasons for Refusal for JP app. No. 2015-170301, dated Jul. 18, 2017, with machine English translation provided by JPO.
Extended European Search Report from EP app. No. 17168297.4, dated Aug. 28, 2017.
Extended European Search Report from EP app. No. 15183087.4, dated Dec. 22, 2016.
Extended European Search Report from EP app No. 17000575.5, dated Dec. 19, 2017.

* cited by examiner

TOP COVER STRUCTURE FOR POWER BATTERY AND POWER BATTERY

CROSS-REFERENCE TO RELATED APPLICATIONS

The present application claims priority to Chinese Patent Application No. 201611007862.2, filed on Nov. 16, 2016, the content of which is incorporated herein by reference in its entirety.

TECHNICAL FIELD

The present application relates to the field of energy storage devices and, particularly, relates to a top cover structure for a power battery and a power battery.

BACKGROUND

Electric vehicle and energy storage power station usually need power battery having large capacity as the power source. Except large capacity, the power battery should also perform better safety and have a longer cycle life, so as to meet application standards and satisfy people's requirements.

In the prior art, when a power battery is over charged, decomposition of electrolyte in power battery will generate excessive heat in the interior of the power battery, which may cause burning of the battery, or increase the internal pressure of the power battery, leading to explosion of the battery (as long as the power battery is not stopped being charged, the internal pressure will increase continuously, until explosion occurs). Therefore, before the power battery is out of control, an external short circuit structure is needed to cut off the connecting component between a positive electrode tab and a positive electrode terminal (or between a negative electrode tab and a negative electrode terminal), so as to stop charging the power battery continuously. Generally, in order to solve abuse nailing problem of the battery, a resistance is arranged between a positive electrode terminal and a top cover plate, so that the positive electrode terminal is electrically connected with the top cover plate through the resistance.

When a power battery is in a situation of being nailed, if the resistance between the positive electrode terminal and the top cover plate is too small, then the current of external short circuit is too large when nailing, the nailing point is easy to spark, causing the cell be out of control, therefore, when nailing, a large resistance is needed between the positive electrode terminal and the top cover plate.

When a power battery is over charged, the internal pressure of the cell increases for a certain value, the short circuit component deforms upward, so that the positive electrode and the negative electrode of the cell are connected to form a short circuit, a large loop current is used to fuse the connecting component, so as to cut off the main loop. However, if the positive electrode and the negative electrode are connected to form a short circuit, since the resistance in the loop is so small that the current in the loop will be too large (such as, exceeding 10000 A), the short circuit component is easy to be fused, thus the short circuit component is fused before the connecting component is fused, which leads to that the loop current cannot maintain, then the connecting component cannot be fused; but if the resistance in the loop is too large, which will cause that the current in the loop is too small (such as, less than 500 A), the connecting component will not be fused, which cannot prevent the power battery from being charged continuously. Therefore, when dealing with over-charging of the power battery; it is obvious that the manner of directly connecting a large resistance is not applicable to reduce current.

Based on the above-mentioned reasons, in order to satisfy the over-charging and nailing problems of the power battery at the same time, the top cover structure of the power battery is needed to be re-optimized, so that the power battery can constitute a loop having an appropriate resistance value under the situations of over-charging and nailing.

SUMMARY

The present application provides a top cover structure for a power battery and a power battery, which can solve the above problems.

A first aspect of the present application provides a top cover structure for a power battery, including a first electrode assembly, a second electrode assembly, a first resistor, a second resistor, a top cover plate, a first short circuit component and a second short circuit component, the first electrode assembly is electrically connected with the top cover plate through the first resistor for all time, the second electrode assembly is insulated from the top cover plate in a normal state, the first short circuit component and the second short circuit component are both attached to the top cover plate, when an internal pressure of the power battery exceeds a reference pressure, both the first short circuit component and the second short circuit component deform by effect of pressure, so as to form a first electrical connecting path through the first electrode assembly, the first short circuit component, the top cover plate, the second short circuit component and the second electrode assembly in sequence, and to form a second electrical connecting path through the first electrode assembly, the first resistor, the top cover plate, the second short circuit component and the second electrode assembly in sequence, the second resistor is connected into the first electrical connecting path in series;

a resistance value of the first resistor is larger than a resistance value of the second resistor.

Preferably, the first resistor is connected with the second resistor in series for all time.

Preferably, the second resistor is either integrated or arranged into the first electrode assembly;

the first short circuit component is electrically connected with the first electrode assembly through the top cover plate, the first resistor and the second resistor for all time.

Preferably, the first electrode assembly includes a first electrode terminal and a first conductive plate, the first electrode terminal passes through the top cover plate, the first conductive plate includes a first connecting portion and a first extending portion which are connected with each other, the second resistor is connected between the first connecting portion and the first electrode terminal in series, the first short circuit component contacts with the first extending portion after deforming by effect of pressure;

either the first resistor is connected between the second resistor and the top cover plate in series, or the first resistor is connected between the first connecting portion and the top cover plate in series.

Preferably, when the first resistor is connected between the first connecting portion and the top cover plate in series, the second resistor is at least one of forms consisting of:

form one, the second resistor is a resistance layer;

form two, the second resistor is either integrated or arranged onto the first conductive plate.

Preferably, the second resistor is integrated onto the first connecting portion, a structure of the first conductive plate is as follows:

the first conductive plate includes a first conductive layer and a second conductive layer, the first conductive layer and the second conductive layer are arranged by stacking, the first conductive layer is configured to contact with the second short circuit component, and a resistivity of the first conductive layer and a resistivity of the second short circuit component are both less than a resistivity of the second conductive layer.

Preferably, the second resistor is either integrated or arranged into the second electrode assembly.

Preferably, the second electrode assembly includes a second electrode terminal and a second conductive plate, the second electrode terminal passes through the top cover plate, and is connected with and insulated from the top cover plate, the second conductive plate is connected with and insulated from the top cover plate, the second conductive plate includes a second connecting portion and a second extending portion which are connected with each other, the second short circuit component contacts with the second extending portion after deforming by effect of pressure;

either the second resistor is connected between the second connecting portion and the second electrode terminal in series, or the second resistor is connected between the second connecting portion and the second extending portion in series.

Preferably, on the second conductive plate, the second extending portion and the second short circuit component adopt a same material.

Preferably, the second resistor is at least one of forms consisting of:

form one, the second resistor is a resistance layer;

form two, the second resistor is either integrated or arranged onto the second conductive plate.

Preferably, the second resistor is integrated onto the second conductive plate, a structure of the second conductive plate is as follows:

the second conductive plate includes a first conductive layer and a second conductive layer, the first conductive layer and the second conductive layer are arranged by stacking, the first conductive layer is configured to contact with the second short circuit component, and a resistivity of the first conductive layer and a resistivity of the second short circuit component are both less than a resistivity of the second conductive layer.

Preferably, the second resistor is connected with the first resistor in parallel.

Preferably, the first electrode assembly includes a first electrode terminal and a first conductive plate, the first electrode terminal passes through the top cover plate, the first conductive plate includes a first connecting portion and a first extending portion which are connected with each other, the first short circuit component contacts with the first extending portion after deforming by effect of pressure, the second resistor is connected between the first connecting portion and the first extending portion in series;

either the first resistor is connected between the first connecting portion and the top cover plate in series, or the first resistor is connected between the first electrode terminal and the top cover plate in series.

Preferably, on the first conductive plate, the first extending portion and the first short circuit component adopt a same material.

Preferably, the first electrode assembly includes a first electrode terminal and a first conductive plate, the first electrode terminal passes through the top cover plate, the first resistor is connected between the first electrode terminal and the top cover plate in series, the first short circuit component contacts with the first extending portion after deforming by effect of pressure, the second resistor is connected between the first electrode terminal and the first conductive plate in series.

Preferably, the first resistor is located underneath the top cover plate, and the second resistor is located above the top cover plate.

Preferably, a resistance value of the first resistor is at least 1000 times larger than a resistance value of the second resistor.

Preferably, the resistance value of the first resistor is 1~100000Ω, or the resistance value of the second resistor is 0.1~100 mΩ.

A second aspect of the present embodiment provides a power battery, including a bare cell and the top cover structure for a power battery, the bare cell has two electrodes with opposite electrical properties, one of the electrodes is electrically connected with the first electrode assembly, the other electrode thereof is electrically connected with the second electrode assembly, when an internal pressure of the power battery exceeds a reference pressure, the first short circuit component and the second short circuit component deform by effect of pressure, so as to form a first electrical connecting loop from the bare cell back to the bare cell passing through the first electrical connecting path, and to form a second electrical connecting loop from the bare cell back to the bare cell passing through the second electrical connecting path.

Preferably, further including a first connecting piece and a second connecting piece, one of the electrodes is electrically connected with the first electrode assembly through the first connecting piece, the other electrode thereof is electrically connected with the second electrode assembly through the second connecting piece, and a fusing member is formed on the first connecting piece and/or the second connecting piece.

Preferably, the fusing member is formed through providing a gap and/or a hole on the first connecting piece and/or the second connecting piece.

The technical solution provided by the embodiments of the present application can reach the following beneficial effect:

The top cover structure for a power battery provided by the present application can arrange a first resistor, a second resistor and the corresponding electrical connecting structure at the same time, so as to respectively form a circuit with an appropriate resistance in situation of nailing or over-charging of the power battery.

It should be understood that, the above general description and the following detailed description are merely exemplary, which cannot limit the present application.

REFERENCE SIGNS

Figure 1:
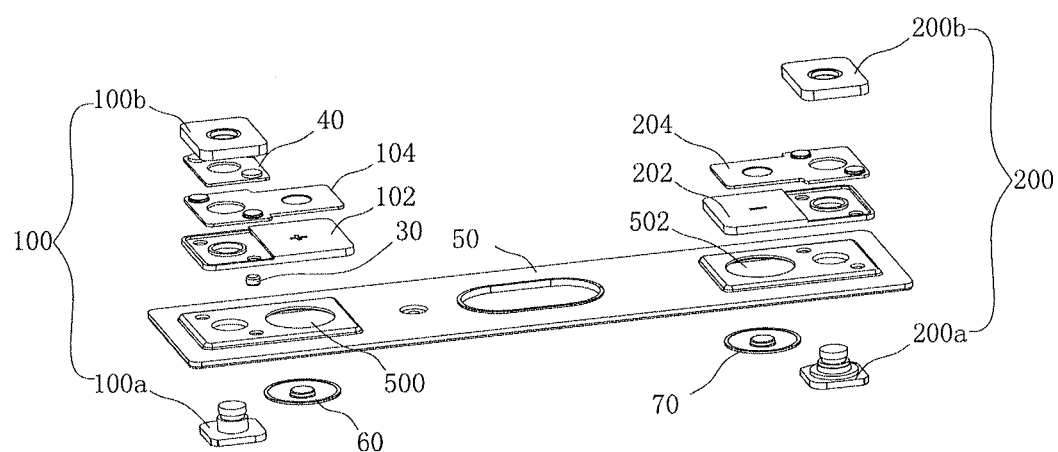
FIG. 1 is an explosive structural schematic diagram of a top cover structure for a power battery provided by an embodiment of the present application.

2—bare cell:
2a—positive electrode tab;
2b—negative electrode tab;
3—housing;
4—first connecting piece;
5—second connecting piece;
6—fusing member;
10—first electrode assembly;
100—first electrode terminal;
100a—first electrode terminal body;
100b—first connecting block;
102—first insulating piece;
104—first conductive plate;
104a—first connecting portion;
104b—first extending portion;
104c—first low over-current area region;
104d—first conductive layer;
104e—second conductive layer;
20—second electrode assembly;
200—second electrode terminal;
200a—second electrode terminal body;
200b—second connecting block;
202—second insulating piece;
204—second conductive plate;
204a—second connecting portion;
204b—second extending portion;
204c—second low over-current area region;
30—first resistor;
40—second resistor;
50—top cover plate;
500—first mounting hole;
502—second mounting hole;
60—first short circuit component;
70—second short circuit component.

The accompanying drawings here are incorporated into the description and form a part thereof, which show embodiments of the present application, and are used to explain the principle of the present application together with the description.

DESCRIPTION OF EMBODIMENTS

The present application will be described in further detail with reference to the following embodiments and the accompanying drawings. The "front", "back", "left", "right", "up", "down" used in this paper take the placement status of a top cover structure for a power battery in the drawings as reference.

Figure 17:
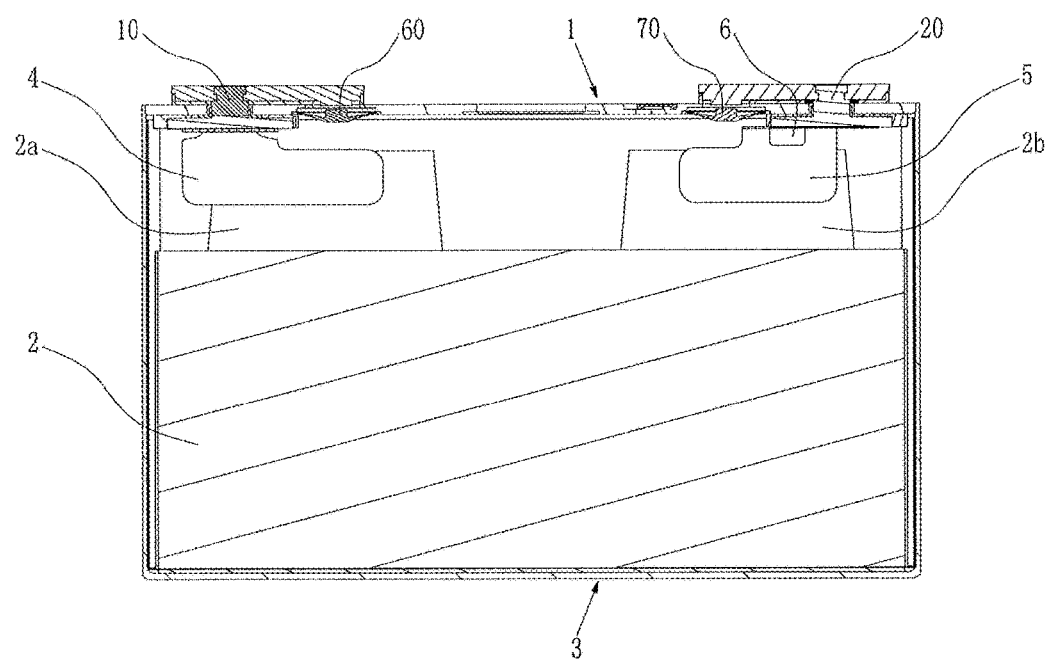
FIG. 17 is an integral structural schematic diagram of a power battery provided by an embodiment of the present application.

The present application provides a power battery, as shown in FIG. 17, which includes a top cover structure 1 for a power battery, a bare cell 2, an housing 3, a first connecting piece 4 and a second connecting piece 5, the bare cell 2 is generally formed by a positive electrode plate, a negative electrode plate and a separator through winding or stacking, a positive electrode tab 2a and a negative electrode tab 2b are respectively provided on the positive electrode plate and the negative electrode plate. The housing 3 is generally made of metal material, and forms, together with the top cover structure 1 for a power battery, a cavity for accommodating the bare cell 2, the bare cell 2 is arranged in the cavity.

Figure 2:
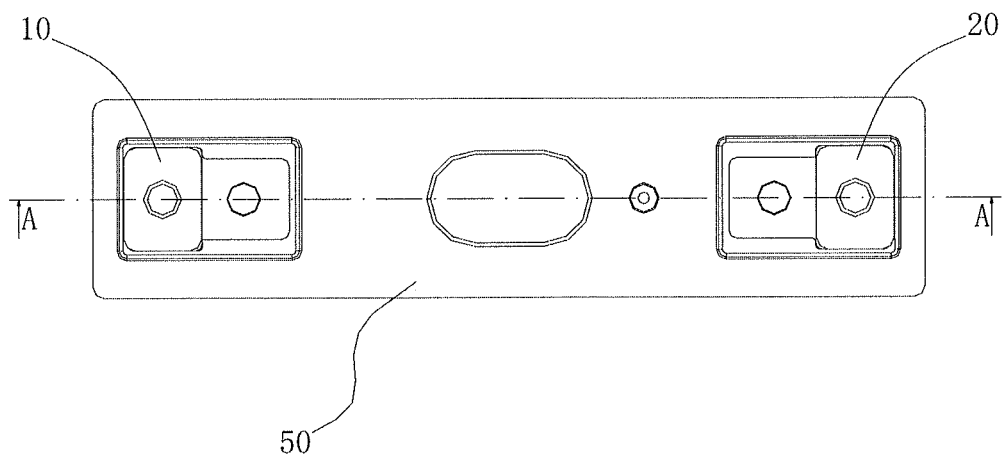
FIG. 2 is a structural schematic diagram of a top cover structure for a power battery when viewing from the top provided by an embodiment of the present application.
Figure 3:
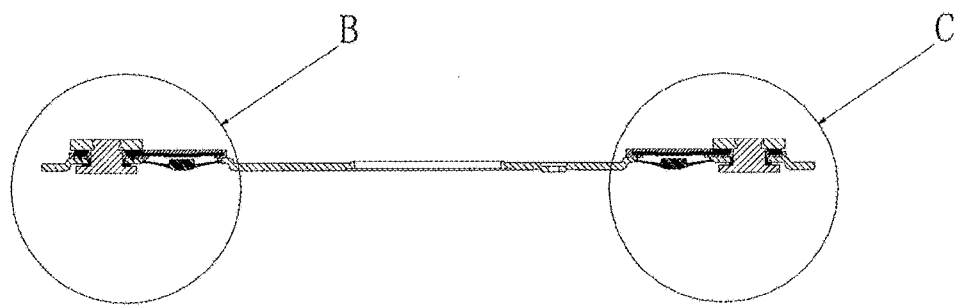
FIG. 3 is a structural schematic diagram of a lateral section along A-A in FIG. 2.

As shown from FIG. 1 to FIG. 3, the top cover structure for a power battery includes a first electrode assembly 10, a second electrode assembly 20, a first resistor 30, a second resistor 40, a top cover plate 50, a first short circuit component 60 and a second short circuit component 70. The first electrode assembly 10 and the second electrode assembly 20 are both attached onto the top cover plate 50, and, either the first electrode assembly 10 or the second electrode assembly 20 is connected with the positive electrode tab 2a or the negative electrode tab 2b of the bare cell through a first connecting piece 4, the other electrode assembly is connected with the other electrode tab of the bare cell through a second connecting piece 5. For example, as shown in FIG. 17, the first electrode assembly 10 is electrically connected with the positive electrode tab 2a of the bare cell 2 through the first connecting piece 4, at the same time, the second electrode assembly 20 is electrically connected with the negative electrode tab 2b of the bare cell 2 through the second connecting piece 5, so as to extend the positive electrode and the negative electrode of the power battery respectively. A fusing member 6 with a gap or of a hole shape is formed on the second connecting piece 5, absolutely, the fusing member 6 can also be arranged on the first connecting piece 4 at the same time or in individual.

In a general situation, the first electrode assembly 10 includes a first electrode terminal 100, the bottom of the first electrode terminal 100 is located underneath the top cover plate 50, the top of the first electrode terminal 100 will go through the top cover plate 50. It should be noted that, the first electrode terminal 100 cannot contact and be electrically connected with the top cover plate 50 directly, but be fixed with a first insulating piece 102 therebetween, in addition, the first electrode terminal 100 needs to keep an electrical connection with the top cover plate 50 through the first resistor 30.

In order to be convenient for an external electrical device to be electrically connected with the power battery, generally, the first electrode terminal 100 can also be designed to be two parts including a first electrode terminal body 100a and a first connecting block 100b, the first electrode terminal body 100a extends through the top cover plate 50, and the first connecting block 100b can be fixed with the top of the first electrode terminal body 100a through a welding or riveting manner, so as to increase contacting area and improve structure of the contacting surface, thereby providing a better connection. In the present embodiment, the first short circuit component 60 and the second short circuit component 70 are two important circuit switches, when the first short circuit component 60 is not deforming, the circuit structure of the top cover structure 1 for a power battery is a nailing protection circuit, when nailing occurs, the nailing protection circuit can be functioned effectively; however, when the first short circuit component 60 and the second short circuit component 70 are connected with the circuit at the same time, the circuit structure of the top cover structure 1 for a power battery will be transformed to an over-charging protection circuit, so as to generate an appropriate circuit to fuse the first connecting piece 4 and/or the second connecting piece 5 near by the fusing member 6, thereby cutting off the electrical connection between the positive electrode tab 2a and the first electrode assembly 10, and/or the electrical connection between the negative electrode tab 2b and the second electrode assembly 20.

The top cover for a power battery has limited space, particularly near the two electrodes because of a plurality of connecting pieces and insulating pieces are needed to be arranged, thereby it is very crowded, in this situation, arranging the first short circuit component 60 thereon also requires better structure design and processing technique.

As shown from FIG. 4 to FIG. 10, in order to make the first short circuit component 60 being connected with the circuit conveniently, first electrode assembly 10 of the present embodiment is further provided with a first conductive plate 104 in the interior thereof, the first conductive plate 104 includes a first connecting portion 104a and a first extending portion 104b which are connected with each other, the first connecting portion 104a is configured to be electrically connected with the first electrode terminal body 100a or the first connecting block 100b of the first electrode terminal 100, and the first extending portion 104b extends outward for a certain distance, at the same time, the first conductive plate 104 is fixed with the top cover plate 50 through the first insulating piece 102. In the present embodiment, the first short circuit component 60 generally adopts a deformable plate form, absolutely, other components which can deform when the internal pressure of the power battery is increasing can also be adopted.

Referring to FIG. 1, the top cover plate 50 is provided with a first mounting hole 500 at a location having a certain distance from the first electrode terminal 100, the first short circuit component 60 is assembled in the first mounting hole 500 and seals the first mounting hole 500, the first extending portion 104b extends above the first mounting hole 500. The first short circuit component 60 can contact the first extending portion 104b and achieve an electrical connection after deforming upward.

Figure 11:
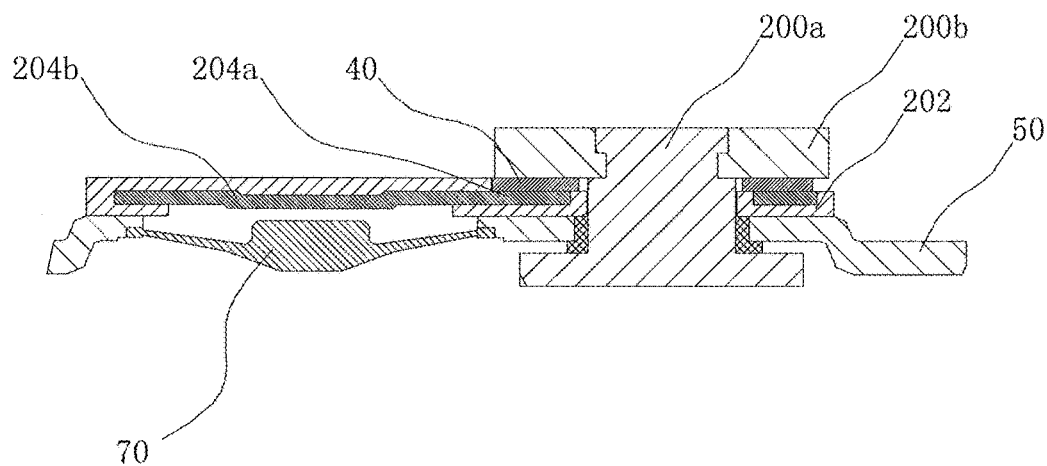
FIG. 11 is a partial enlarged schematic diagram of part C of a first top cover structure for a power battery in FIG. 3 with a second resistor being integrated in a second electrode assembly provided by an embodiment of the present application.
Figure 12:
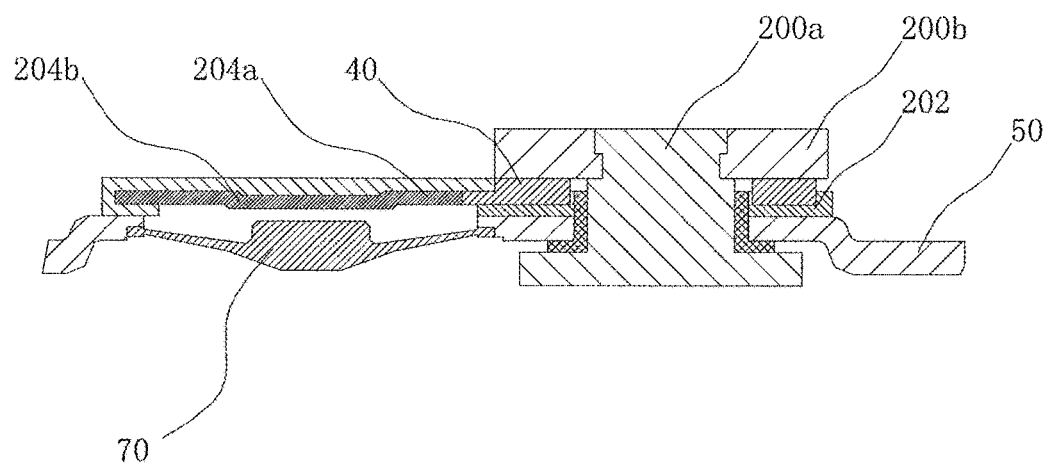
FIG. 12 is a partial enlarged schematic diagram of part C of a second top cover structure for a power battery in FIG. 3 with a second resistor being integrated in a second electrode assembly provided by an embodiment of the present application.
Figure 13:
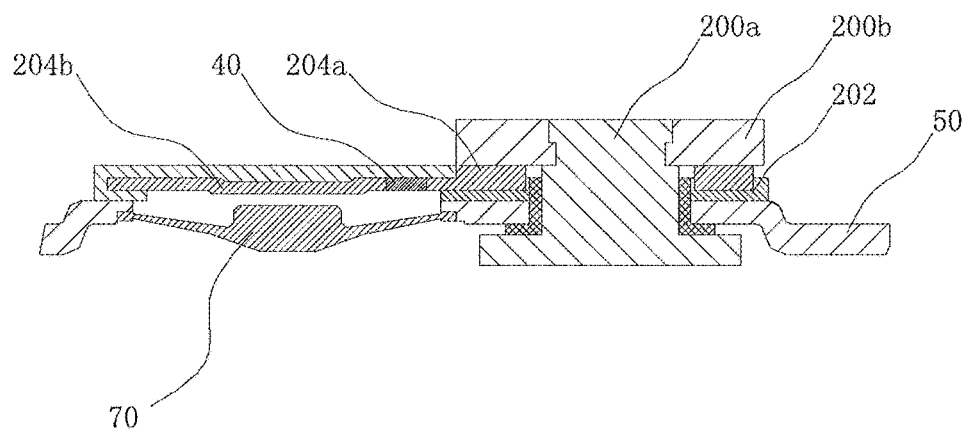
FIG. 13 is a partial enlarged schematic diagram of part C of a third top cover structure for a power battery in FIG. 3 with a second resistor being integrated in a second electrode assembly provided by an embodiment of the present application.

Please referring to FIG. 1, the structure of the second electrode assembly 20 can be same as the first electrode assembly 10, also can be different. In order to be convenient for connecting with the external electrical device and the second short circuit component 70, the second electrode assembly 20 can also adopt a structure similar to the first electrode assembly 10, specifically including a second electrode terminal 200, a second insulating piece 202 and a second conductive plate, the second electrode terminal 200 includes a second electrode terminal body 200a and a second connecting block 200b, the second electrode terminal body 200a extends through the top cover plate 50 and is connected with the second connecting block 200b. As shown from FIG. 11 to FIG. 13, the second conductive plate 204 includes a second connecting portion 204a and a second extending portion 204b which are connected with each other, the second connecting portion 204a is configured to be electrically connected with the second electrode terminal body 200a or the second connecting block 200b of the second electrode terminal 200, the second extending portion 204b extends outward for a certain distance. The top cover plate 50 is provided with a second mounting hole 502 at a location having a certain distance from the second electrode terminal 200, the second short circuit component 70 is assembled in the second mounting hole 502 and seals the second mounting hole 502, the second extending portion 204b extends above the second mounting hole 502. The second short circuit component 70 can contact the second extending portion 204b and achieve an electrical connection after deforming upward. Before the second short circuit component 70 contacts with the second extending portion 204b, the second electrode assembly 20 is connected with the top cover plate 50 only through the second insulating piece 202 in a general situation, and thus is insulated.

In the above structure, the first short circuit component 60 will contact with the first conductive plate 104 after deforming, if the difference of resistivity at the contacting position of the first short circuit component 60 and the first conductive plate 104 is relatively large, then the first short circuit component 60 may be fused directly, however, this situation can be effectively avoided if the resistivity therebetween are similar at the contacting position. Therefore, on the first conductive plate 104, at least the material of the first extending portion 104b is the same as the first short circuit component 60, aluminum metal is recommended in practical production. Similarly, on the second conductive plate 204, at least the material of the second extending portion 204b is the same as the second short circuit component 70.

The structure of the two protection circuits will be described in detail below.

In a general situation, in order to prevent the top cover plate 50 and the housing 3 of the power battery from being corroded, the positive electrode tab 2a of the bare cell is needed to be connected with the top cover plate 50 and the housing 3 all the time, so that the top cover plate 50 and the housing 3 is positively charged.

All the following embodiments take that the first electrode assembly 10 is connected with the positive electrode tab 2a, the second electrode assembly 20 is connected with the negative electrode tab 2b as an example, the first electrode terminal 100 is electrically connected with the top cover plate 50 through the first resistor 30 all the time, so that the top cover plate 50 is positively charged for all time.

When nailing occurs, and the pressure in the housing is not sufficient to make the first short circuit component 60 deform, the nail will make the negative electrode plate in the power battery be connected with the housing and the top cover plate 50, the top cover plate 50 is connected with the first electrode terminal 100 of the first electrode assembly 10 through a first resistor 30, and then finally connected with the positive electrode plate in the interior of the bare cell through the positive electrode tab 2a, so as to form a nailing loop. The resistance value of the first resistor 30 is generally 1~100000Ω. In the nailing loop, the existence of the first resistor 30 can effectively reduce the current in the nailing loop, and effectively prevent the situation that since the current is too large, causing sparking at the nailing point, igniting the electrolyte, and result in burning of the power battery. The first resistor 30 can adopt a resistance block (referring to FIGS. 4, 8, 9, 10), conductive plastic (referring to FIGS. 5-7) and the like, when adopting conductive plastic, the first resistor 30 can replace or partially replace the first insulating piece 102.

When over-charging occurs, since the circuit needs to generate a larger current to fuse the fusing member 6, but the resistance value of the first resistor 30 is too lame, therefore, it should be prevented that the first resistor 30 is directly connected with the circuit in series in the over-charging protection circuit. At the same time, in order to prevent from causing the top of the first short circuit component 60 and the second short circuit component 70 be cut or fused by the over-large current, a second resistor 40 is needed to be connected into the circuit, the resistance value of the second resistor 40 cannot be too large, generally cannot exceed 1/1000 of the resistance value of the first resistor 30, the range of 0.1~100 mΩ is preferred. In order to satisfy the above-mentioned requirements, the present embodiment takes a careful consideration on the arrangement location of the first resistor 30 and the second resistor 40, which will be described in detail below.

In the present embodiment, after the first short circuit component 60 contacts and is electrically connected with the first extending portion 104b, a low resistance branch and a high resistance branch can be formed, and the first resistor 30 is located in the high resistance branch, so as to decrease the resistance value of the whole over-charging protection circuit.

In order to satisfy such requirement, the first resistor 30 at least has two connection structures as follows:

Structure One: the first resistor 30 can be connected in series between the first connecting portion 104a and the top cover plate 50 (referring to FIGS. 4, 5, 7, 8), thus, a first branch is constituted from the first connecting portion 104a to the top cover plate 50 passing through the first resistor 30, a second branch is constituted from the first connecting portion 104a to the top cover plate 50 passing through the first extending portion 104b and the first short circuit component 60, the two branches are in parallel.

Figure 6:
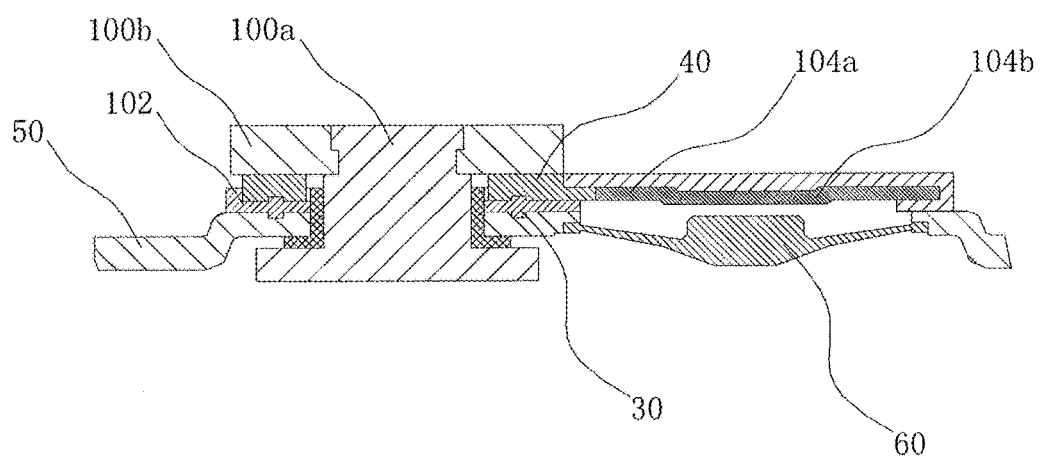
FIG. 6 is a partial enlarged schematic diagram of part B of a third top cover structure for a power battery in FIG. 3 with a second resistor being integrated in a first electrode assembly provided by an embodiment of the present application.
Figure 9:
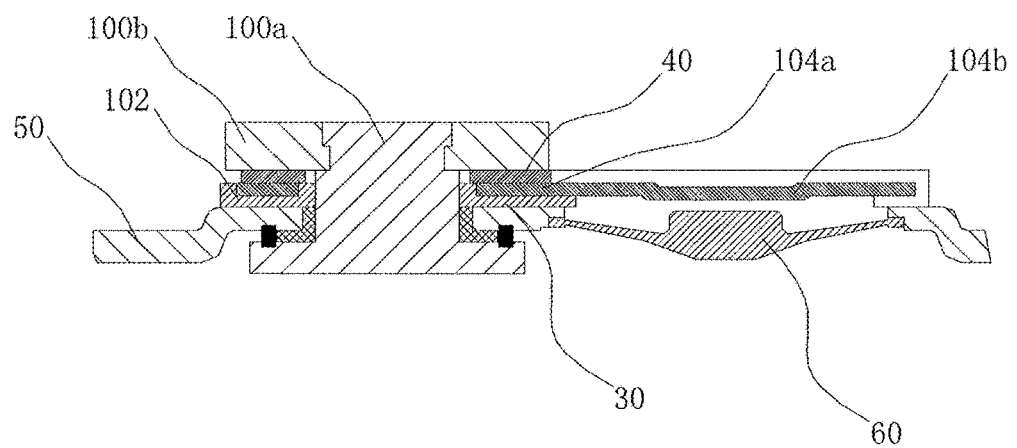
FIG. 9 is a partial enlarged schematic diagram of part B of a sixth top cover structure for a power battery in FIG. 3 with a second resistor being integrated in a first electrode assembly provided by an embodiment of the present application.
Figure 10:
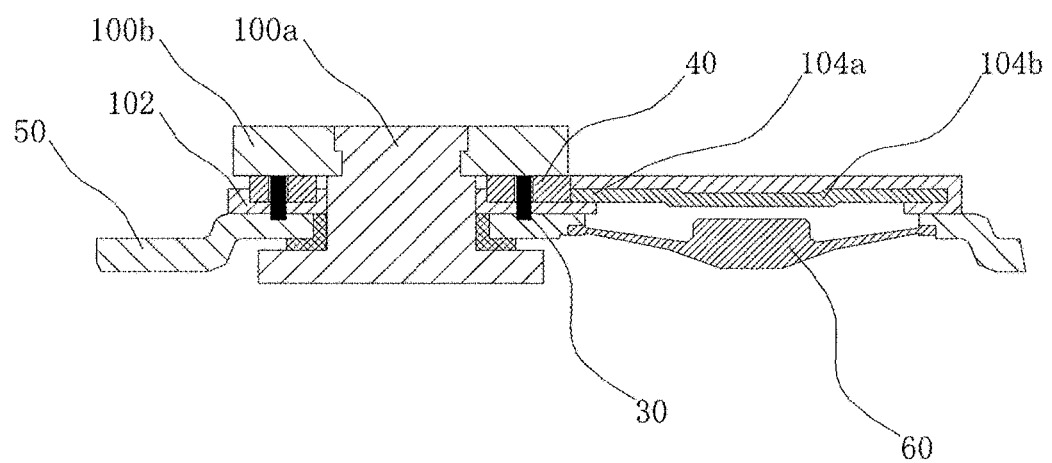
FIG. 10 is a partial enlarged schematic diagram of part B of a seventh top cover structure for a power battery in FIG. 3 with a second resistor being integrated in a first electrode assembly provided by an embodiment of the present application.

Structure Two: the first electrode terminal body 100a or the first connecting block 100b can be electrically connected with the top cover plate 50 passing through the first resistor 30, at the same time, the first connecting portion 104a is also electrically connected with the first electrode terminal body 100a or the first connecting block 100b (referring to FIGS. 6, 9, 10). That means, the first resistor 30 and the first connecting portion 104a are electrically connected with the first electrode terminal 100 at the same time. Thus, a first branch is constituted from the first electrode terminal 100 to the top cover plate 50 passing through the first resistor 30, a second branch is constituted from the first connecting portion 104a to the top cover plate 50 passing through the first extending portion 104b and the first short circuit component 60, the two branches are still in parallel.

When the power battery is over charged, and the internal pressure exceeds the reference pressure, the first short circuit component 60 and the second short circuit component 70 will deform by effect of pressure. Specifically, the first short circuit component 60 and the second short circuit component 70 may deform at the same time, or respectively deforms one after another. After the first short circuit component 60 and the second short circuit component 70 deform and contact with the first electrode assembly 10 and the second electrode assembly 20, respectively, a first electrical connecting path and a second electrical connecting path can be formed. The first electrical connecting path arrives at the second electrode assembly 20 from the first electrode assembly 10 passing through the first short circuit component 60, the top cover plate 50, the second short circuit component 70, the second electrical connecting path arrives at the second electrode assembly 20 from the first electrode assembly 10 passing through the first resistor 30, the top cover plate 50, the second short circuit component 70. At this time, the second resistor 40 needs to be connected into the first electrical connecting path in series.

Since the first electrode assembly 10 and the second electrode assembly 20 are respectively connected with the positive electrode plate and the negative electrode plate of the bare cell 2, therefore, after the first electrical connecting path and the second electrical connecting path are formed, two loops will be formed at the same time, that is, the first electrical connecting loop of the bare cell passing through the first electrical connecting path then back to the bare cell 2, and the second electrical connecting loop of the bare cell 2 passing through the second electrical connecting path then back to the bare cell, the first electrical connecting loop and the second electrical connecting loop constitute the over-charging protection loop. Since the resistance value of the first electrical connecting path is far less than the resistance value of the second electrical connecting path, since a larger current can be formed on the first electrical connecting loop at this time, and since the second resistor 40 is provided at the same time, so as to avoid the first short circuit component 60 and the second short circuit component 70 from being top cut or fused, so as to guarantee that the fusing member 6 is fused firstly, and prevent the power battery from being over-charged.

Therefore, the second resistor 40 has the following connecting manners:

A first connecting manner: the second resistor 40 keeps a serial connection with the first resistor 30. At this time, the second resistor 40 can be integrated in the first electrode assembly 10 (referring to FIGS. 4, 5, 6, 8), and can also be integrated in the second electrode assembly 20 (referring to FIGS. 11-13).

Figure 7:
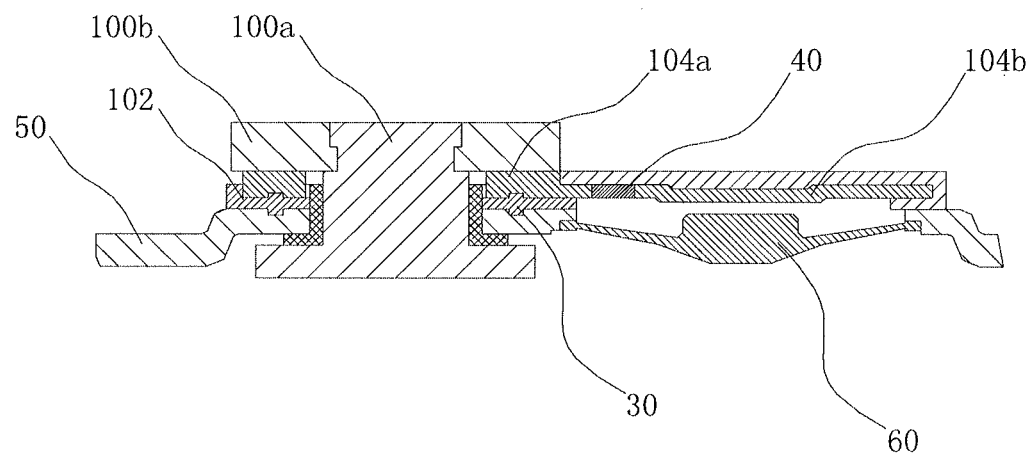
FIG. 7 is a partial enlarged schematic diagram of part B of a fourth top cover structure for a power battery in FIG. 3 with a second resistor being integrated in a first electrode assembly provided by an embodiment of the present application.

The second connecting manner: the second resistor 40 is connected with the first resistor 30 in parallel, in this situation, generally, the second resistor 40 is integrated in the first electrode assembly 10 (referring to FIGS. 7, 9, 10).

Firstly, the first connecting manner will be described in detail.

In the first connecting manner, for the solution that the second resistor 40 and the first resistor 30 to be integrated in the first electrode assembly 10 with a serial relation, it should be guaranteed that the first short circuit component 60 is connected into the circuit at the second resistor 40 or between the first resistor 30 and the second resistor 40 after contacting the first electrode assembly 10, so as to form a low resistance branch and a high resistance branch including the first resistor 30 after the first short circuit component 60 deforms, and the second resistor 40 is in the main loop all the time.

Specifically, the second resistor 40 is connected in series between the first connecting portion 104*a* and the first electrode terminal 100. That means, the second resistor 40 can be connected in series between the first electrode terminal body 100*a* and the first connecting portion 104*a*, and can also be connected in series between the first connecting block 100*b* and the first connecting portion 104*a*.

Figure 4:
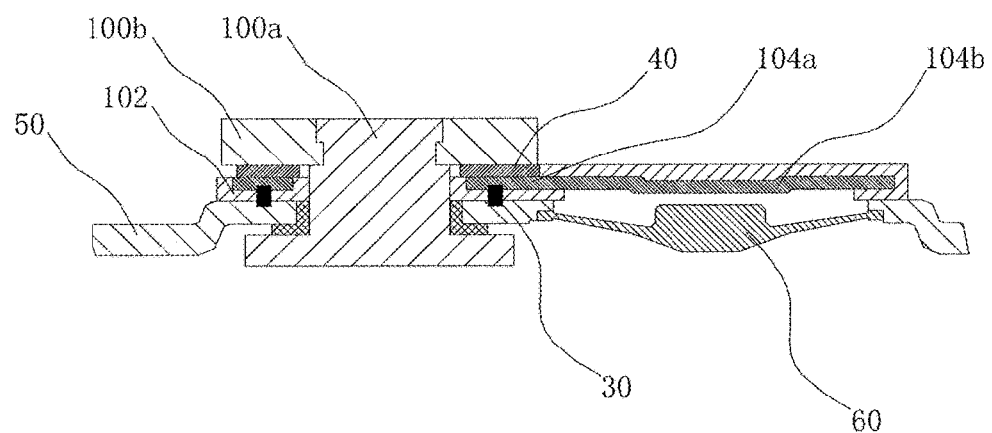
FIG. 4 is a partial enlarged schematic diagram of part B of a first top cover structure for a power battery in FIG. 3 with a second resistor being integrated in a first electrode assembly provided by an embodiment of the present application.
Figure 5:
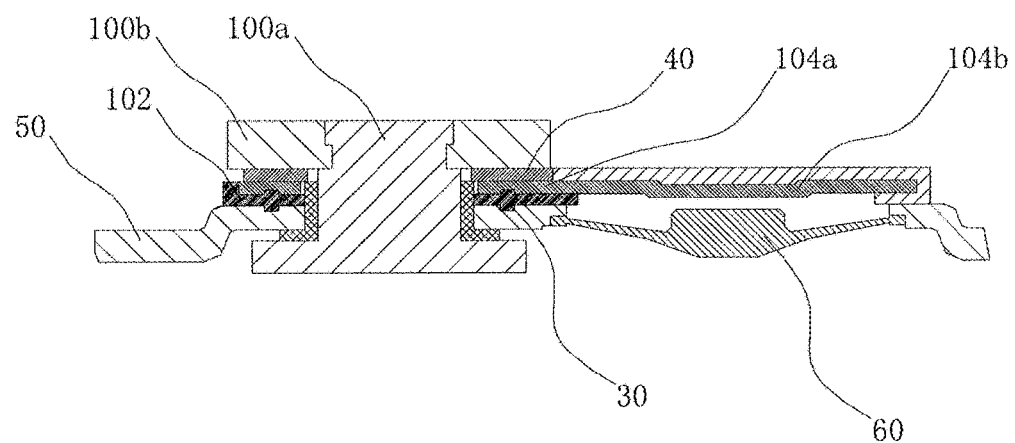
FIG. 5 is a partial enlarged schematic diagram of part B of a second top cover structure for a power battery in FIG. 3 with a second resistor being integrated in a first electrode assembly provided by an embodiment of the present application.

At this time, as shown in FIG. 4 and FIG. 5, the first resistor 30 can adopt Structure One, thus, the first resistor 30 and the second resistor 40 are respectively located at two sides of the first connecting portion 104*a*, the first short circuit component 60 can be conducted to the first connecting portion 104*a* by the first extending portion 104*b* after contacting with the first extending portion 104*b*. that is, being connected into the circuit between the first resistor 30 and the second resistor 40.

Figure 14:
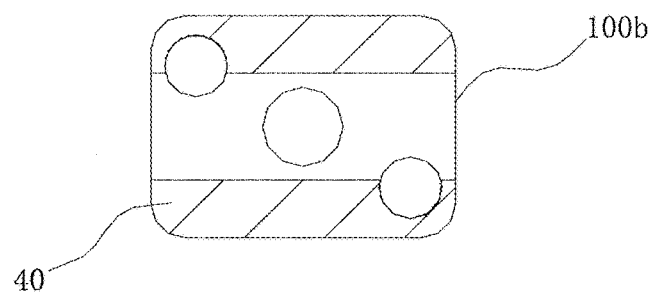
FIG. 14 is a structural schematic diagram of a first connecting block having a surface layer coated with a Teflon® layer as a second resistor when viewing from the top.

In the above-mentioned solution, the second resistor 40 can be the following forms:

Form One, the second resistor 40 adopts a resistance layer structure directly, for example, insulating the surface of the first electrode terminal body 100*a*, the first connecting block 100*b* or the first connecting portion 104*a* by spraying a layer of Teflon® material (referring to FIG. 14), so as to increase resistance value.

Form Two, the second resistor 40 is arranged on or integrated into the first conductive plate 104. The two manners are similar, the difference lies in whether the second resistor 40 and the first conductive plate 104 can be distinguished or not. For example, embedding the second resistor 40 into the first connecting portion 104*a* can be regarded as an arranging manner, while it can be regarded as an integrating manner if material having a high resistivity such as ni-chrome and the like is adopted to produce the first connecting portion 104*a*, and aluminum material is adopted to produce the first extending portion 104*b*.

Figure 8:
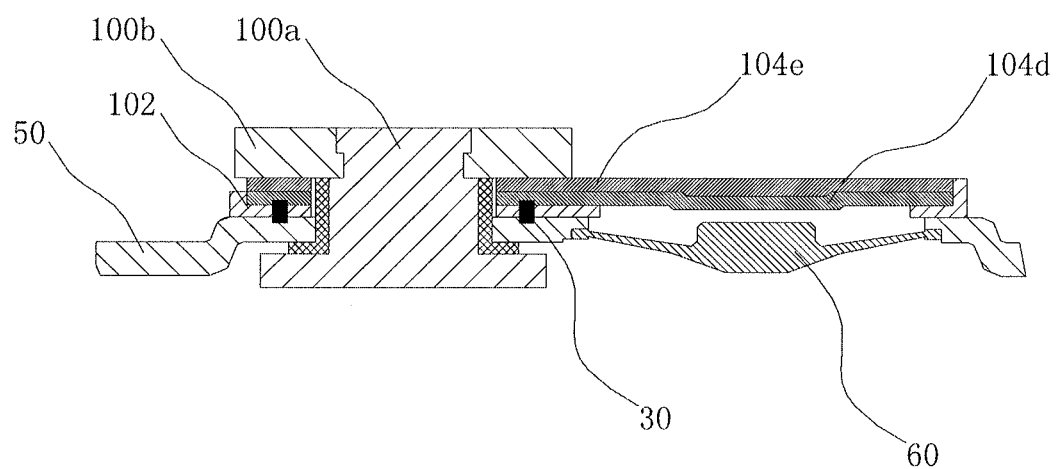
FIG. 8 is a partial enlarged schematic diagram of part B of a fifth top cover structure for a power battery in FIG. 3 with a second resistor being integrated in a first electrode assembly provided by an embodiment of the present application.

Besides, there is a more preferred solution, as shown in FIG. 8, in this solution, the first conductive plate 104 adopts a double-layer-structure design, including the first conductive layer 104*d* and the second conductive layer 104*e* which are stacked, when assembling, the first conductive layer 104*d* needs to be provided directed toward the first short circuit component 60, and configured to contact with the first short circuit component 60, the second conductive layer 104*e* then is provided away from the first short circuit component 60. In this structure, the resistivity of the first conductive layer 104*d* and the first short circuit component 60 are both less than the resistivity of the second conductive layer 104*e*, it is most preferred that the resistivity of the first conductive layer 104*d* is same or close to the resistivity of the first short circuit component 60, and a part of the second conductive layer 104*e* can be regarded as the second resistor 40.

Since the first conductive plate 104 itself is of a plate-shaped structure, therefore, a too complex structure will increase processing difficulty significantly, leading to a great increasing of cost. However, the double-layer structure is a relative simple structure. When using this structure, although only a part of the second conductive layer 104*e* can be used as the second resistor 40, while the rest parts are all short circuit by the first conductive layer 104*d*, however, since it is convenient to process the double-layer stacking structure, thereby the processing cost can be saved a lot, and since an ordered structure is achieved, which can also simply assembling technique, the total cost is still low.

Besides, as shown in FIG. 6, the first resistor 30 can also adopt Structure Two, it should be noted that, since the second resistor 40 is added, therefore, the electrical connection between the first resistor 30 and the first electrode terminal 100 also needs the second resistor 40, that is, either the first resistor 30 or the first connecting portion 104*a* is electrically connected with the first electrode terminal 100 through the second resistor 40, the first short circuit component 60 can be conducted to the second resistor 40 passing through the first extending portion 104*b*, the first connecting portion 104*a* after contacting with the first extending portion 104*b*.

The first connecting manner will be further illustrated as follows. As shown from FIG. 11 to FIG. 13, in this connecting manner, the second resistor 40 can be integrated in the second electrode assembly 20, specifically, can be connected in series between the second electrode terminal body 200*a* and the second connecting portion 204*a*, and can also be connected in series between the second connecting block 200*b* and the second connecting portion 204*a* (referring to FIG. 11 and FIG. 12), or be connected in series between the second connecting portion 204*a* and the second extending portion 204*b* (referring to FIG. 13).

For this solution, the second resistor 40 can be the following forms:

Form One, the second resistor 40 adopts a resistance layer structure directly, for example, insulating the surface of the second electrode terminal body 200*a*, the second connecting block 200*b* or the second connecting portion 204*a* by spraying a layer of Teflon® material, so as to increase resistance value.

Form Two, the second resistor 40 is integrated into or arranged on the second conductive plate 204.

Figure 15:
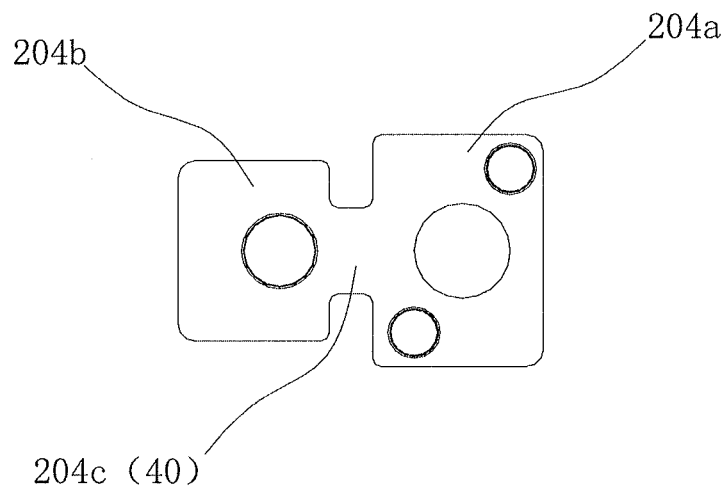
FIG. 15 is a structural schematic diagram of a second conductive plate.

Form Two can be achieve by improving the structure, as shown in FIG. 15, a second low over-current area region 204*c* can be provided on the second extending portion 204*b*, the over-current area of the second low over-current area region 204*c* is less than the second connecting portion 204*a*, thus, the second low over-current area region 204*c* can have larger resistance, so as to be regarded as the second resistor 40.

Besides, as a preferred solution, the second conductive plate 204 can also adopt a double-layer structure design, the specific structure is substantially the same as the first conductive plate 104, the connecting relation with the second short circuit component 70 is the same as the relation between the first conductive plate 104 and the first short circuit component 60, which will not be repeated here.

The present embodiment will describe the second connecting manner, that is, describe the manner of connecting the first resistor 30 and the second resistor 40 in parallel in detail. The first resistor 30 still adopts Structure One or Structure Two. At this time. the second resistor 40 can be connected in series between the first connecting portion 104a and the first extending portion 104b (referring to FIG. 7). Thus, the first short circuit component 60 can be a switch for controlling the connecting state of the second resistor 40. In a normal state or a nailing state, the second resistor 40 is in an open circuit state, which is not connected into the circuit, while after the first short circuit component 60 deforms upward and contacts with the first extending portion 104b under the effect of the internal pressure of the power battery, the second resistor 40 is connected into the circuit, at this time, the second resistor 40 keeps a parallel relation with the first resistor 30.

Figure 16:
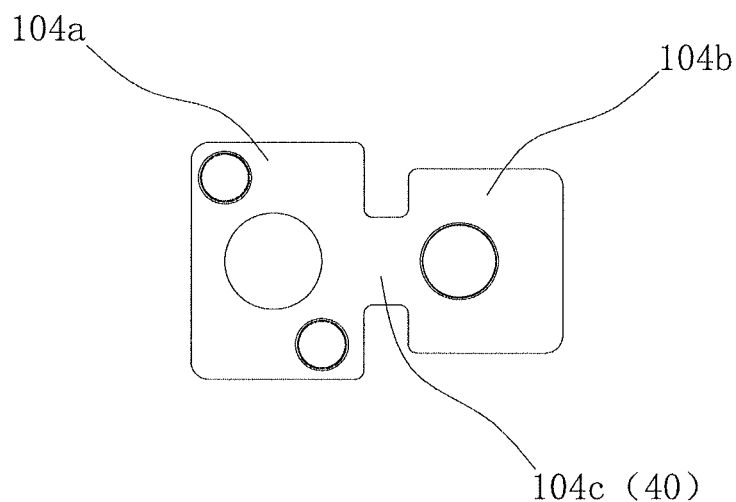
FIG. 16 is a structural schematic diagram of a first conductive plate.

As shown in FIG. 16, the second resistor 40 can be directly integrated on the first conductive plate 104, specifically, a first low over-current area region 104c is provided between the first connecting portion 104a and the first extending portion 104b, the over-current area of the first low over-current area region 104c is less than the first connecting portion 104a, thus, the first low over-current area region 104c can have larger resistance, so as to be regarded as the second resistor 40.

Besides, when the first resistor 30 adopts Structure Two, the second resistor 40 can also be connected in series at the first electrode terminal body 100a or between the first connecting block 100b and the first conductive plate 104.

For example, as shown in FIG. 9, the first resistor 30 is located underneath the top cover plate 50, and is electrically connected with the first electrode terminal body 100a and the top cover plate 50, respectively; the second resistor 40 is located above the top cover plate 50, and is electrically connected with the first connecting block 100b and the first connecting portion 104a of the first conductive plate 104, respectively.

For another example, as shown in FIG. 10, the first resistor 30 and the second resistor 40 are both located between the top cover plate 50 and the first connecting block 100b, the first resistor 30 the second resistor 40 do not contact with each other or are insulated by filling insulating material therebetween, and the first resistor 30 and the second resistor 40 are both electrically connected with the first connecting block 100b, besides, the first resistor 30 is connected with the top cover plate 50 downward, and the side portion of the second resistor 40 is connected with the first connecting portion 104a of the first conductive plate 104.

In the two solutions, in a normal state or a nailing state, the second resistor 40 is in an open circuit state, which is not connected into the circuit, while after the first short circuit component 60 deforms upward and contacts with the first extending portion 104b under the effect of the internal pressure of the power battery, the second resistor 40 is connected into the circuit, at this time, the second resistor 40 still keeps a parallel relation with the first resistor 30.

For the solution that the second resistor 40 is integrated in the first electrode assembly 10, in the parallel connecting manner, the second resistor 40 can be arranged along the length direction of the first conductive plate 104, therefore, the space is relatively larger comparing with the serial connecting solution, which is more convenient to adjust the resistance value of the second resistor 40, and is convenient for heat dissipation at the same time.

After the over-charging protection circuit is formed, the first short circuit component 60, the second short circuit component 70 and the second resistor 40 are the concentration areas of heat dissipation, comparing with the parallel manner, the arranging position of the second resistor 40 in the serial connecting manner is more flexible, therefore, which can be arranged at the location far away from the first short circuit component 60 and the second short circuit component 70, so as to spread the heat generation areas, thus is more convenient for heat dissipation.

The top cover structure for a power battery provided by the present application can form a circuit with an appropriate resistance in situations of nailing or over-charging of the power battery, respectively.

The above are merely the preferred embodiments of the present application, which will not limit the present application, for those skilled in the art, the present application can have various modifications and variations, any modifications, equivalent replacements and improvements based on the present application shall all fall in the protection scope of the present application.

What is claimed is:

1. A top cover structure for a power battery, comprising a first electrode assembly, a second electrode assembly, a first resistor, a second resistor, a top cover plate, a first short circuit component and a second short circuit component, wherein the first electrode assembly is electrically connected with the top cover plate through the first resistor for all time, the second electrode assembly is insulated from the top cover plate in a normal state, the first short circuit component and the second short circuit component are both attached to the top cover plate, the first resistor is connected with the second resistor in series for all time, the second resistor is either integrated or arranged into the second electrode assembly, the second electrode assembly comprises a second electrode terminal and a second conductive plate, the second electrode terminal passes through the top cover plate, and is connected with and insulated from the top cover plate, the second conductive plate is connected with and insulated from the top cover plate, the second conductive plate comprises a second connecting portion and a second extending portion which are connected with each other, the second short circuit component contacts with the second extending portion after deforming by effect of pressure, either the second resistor is connected between the second connecting portion and the second electrode terminal in series, or the second resistor is connected between the second connecting portion and the second extending portion in series, when an internal pressure of the power battery exceeds a reference pressure, both the first short circuit component and the second short circuit component deform by effect of pressure, so as to form a first electrical connecting path through the first electrode assembly, the first short circuit component, the top cover plate., the second short circuit component and the second electrode assembly in sequence, and to form a second electrical connecting path through the first electrode assembly, the first resistor, the top cover plate, the second short circuit component and the second electrode assembly in sequence, the second resistor is connected into the first electrical connecting path in series;

a resistance value of the first resistor is larger than a resistance value of the second resistor, a resistance value of the first resistor is between 1Ω and 100,000Ω, a resistance value of the second resistor is between 0.1 mΩ and 100 mΩ, the resistance value of the first resistor and the resistance value of the second resistor are selected such that the resistance value of the first resistance is at least 1000 times larger than the resistance value of the second resistance, wherein on the second conductive plate, the second extending portion and the second short circuit component adopt a same material.

2. The top cover structure for a power battery according to claim 1, wherein the second resistor is either integrated or arranged into the first electrode assembly;

the first short circuit component is electrically connected with the first electrode assembly through the top cover plate, the first resistor and the second resistor for all time.

3. The top cover structure for a power battery according to claim 2, wherein the first electrode assembly comprises a first electrode terminal and a first conductive plate, the first electrode terminal passes through the top cover plate, the first conductive plate comprises a first connecting portion and a first extending portion which are connected with each other, the second resistor is connected between the first connecting portion and the first electrode terminal in series, the first short circuit component contacts with the first extending portion after deforming by effect of pressure;

either the first resistor is connected between the second resistor and the top cover plate in series, or the first resistor is connected between the first connecting portion and the top cover plate in series.

4. The top cover structure for a power battery according to claim 3, wherein when the first resistor is connected between the first connecting portion and the top cover plate in series, the second resistor is at least one of forms consisting of:
form one, the second resistor is a resistor layer;
form two, the second resistor is either integrated or arranged onto the first conductive plate.

5. The top cover structure for a power battery according to claim 4, wherein the second resistor is integrated onto the first connecting portion, a structure of the first conductive plate is as follows:

the first conductive plate comprises a first conductive layer and a second conductive layer, the first conductive layer and the second conductive layer are arranged by stacking, the first conductive layer is configured to contact with the second short circuit component, and a resistivity of the first conductive layer and a resistivity of the second short circuit component are both less than a resistivity of the second conductive layer.

6. The top cover structure for a power battery according to claim 1, wherein
the second resistor is at least one of forms consisting of:
form one, the second resistor is a resistor layer;
form two, the second resistor is either integrated or arranged onto the second conductive plate.

7. The top cover structure for a power battery according to claim 6, wherein the second resistor is integrated onto the second conductive plate, a structure of the second conductive plate is as follows:

the second conductive plate comprises a first conductive layer and a second conductive layer, the first conductive layer and the second conductive layer are arranged by stacking, the first conductive layer is configured to contact with the second short circuit component, and a resistivity of the first conductive layer and a resistivity of the second short circuit component are both less than a resistivity of the second conductive layer.

8. The top cover structure for a power battery according to claim 1, wherein the second resistor is connected with the first resistor in parallel.

9. The top cover structure for a power battery according to claim 8, wherein the first electrode assembly comprises a first electrode terminal and a first conductive plate, the first electrode terminal passes through the top cover plate, the first conductive plate comprises a first connecting portion and a first extending portion which are connected with each other, the first short circuit component contacts with the first extending portion after deforming by effect of pressure, the second resistor is connected between the first connecting portion and the first extending portion in series;

either the first resistor is connected between the first connecting portion and the top cover plate in series, or the first resistor is connected between the first electrode terminal and the top cover plate in series.

10. The top cover structure for a power battery according to claim 3, wherein on the first conductive plate, the first extending portion and the first short circuit component adopt a same material.

11. The top cover structure for a power battery according to claim 8, wherein the first electrode assembly comprises a first electrode terminal and a first conductive plate, the first electrode terminal passes through the top cover plate, the first resistor is connected between the first electrode terminal and the top cover plate in series, the first short circuit component contacts with the first extending portion after deforming by effect of pressure, the second resistor is connected between the first electrode terminal and the first conductive plate in series.

12. The top cover structure for a power battery according to claim 11, wherein the first resistor is located underneath the top cover plate, and the second resistor is located above the top cover plate.

13. A power battery, comprising a bare cell and the top cover structure for a power battery according to claim 1, the bare cell has two electrodes with opposite electrical properties, one of the electrodes is electrically connected with the first electrode assembly, the other electrode thereof is electrically connected with the second electrode assembly, when an internal pressure of the power battery exceeds a reference pressure, the first short circuit component and the second short circuit component deform by effect of pressure, so as to form a first electrical connecting loop from the bare cell back to the bare cell passing through the first electrical connecting path, and to form a second electrical connecting loop from the bare cell back to the bare cell passing through the second electrical connecting path.

14. The power battery according to claim 13, further comprising a first connecting piece and a second connecting piece, one of the electrodes is electrically connected with the first electrode assembly through the first connecting piece, the other electrode thereof is electrically connected with the second electrode assembly through the second connecting piece, and a fusing member is formed on the first connecting piece and/or the second connecting piece.

\* \* \* \* \*